(12) United States Patent
Rohani et al.

(10) Patent No.: US 10,579,067 B2
(45) Date of Patent: Mar. 3, 2020

(54) METHOD AND SYSTEM FOR VEHICLE LOCALIZATION

(71) Applicants: Mohsen Rohani, Gatineau (CA); Song Zhang, Ottawa (CA)

(72) Inventors: Mohsen Rohani, Gatineau (CA); Song Zhang, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 217 days.

(21) Appl. No.: 15/655,349

(22) Filed: Jul. 20, 2017

(65) Prior Publication Data

US 2019/0025854 A1    Jan. 24, 2019

(51) Int. Cl.

| G05D 1/02 | (2006.01) |
|---|---|
| G05D 1/00 | (2006.01) |
| G06K 9/48 | (2006.01) |
| G06K 9/46 | (2006.01) |
| G01C 21/28 | (2006.01) |
| G06K 9/00 | (2006.01) |
| G01C 21/36 | (2006.01) |
| G01C 21/00 | (2006.01) |

(52) U.S. Cl.
CPC .......... *G05D 1/0276* (2013.01); *G01C 21/00* (2013.01); *G01C 21/005* (2013.01); *G01C 21/28* (2013.01); *G01C 21/3602* (2013.01); *G05D 1/0088* (2013.01); *G05D 1/0246* (2013.01); *G05D 1/0274* (2013.01); *G06K 9/00201* (2013.01); *G06K 9/46* (2013.01); *G06K 9/48* (2013.01); *G05D 2201/02* (2013.01); *G06K 9/00637* (2013.01)

(58) Field of Classification Search
CPC .............................................. B60R 2300/607
See application file for complete search history.

(56) References Cited

U.S. PATENT DOCUMENTS

| 8,446,268 B2* | 5/2013 | Hideshiro | .............. H04N 7/181 340/435 |
|---|---|---|---|
| 8,854,231 B2 | 10/2014 | Thomas et al. | |
| 2003/0165255 A1* | 9/2003 | Yanagawa | ................. B60R 1/00 382/104 |

(Continued)

FOREIGN PATENT DOCUMENTS

CN     106407315 A     2/2017

OTHER PUBLICATIONS

Jesse Levinson, Michael Montemerlo, and Sebastian Thrun, "Map-Based Precision Vehicle Localization in Urban Environments", Robotics: Science and Systems III, Georgia Institute of Technology, Jun. 27-30, 2007, MIT Press, Cambridge, Massachusetts, 2008, 8 pages.

(Continued)

*Primary Examiner* — Thomas G Black
*Assistant Examiner* — Sara J Lewandroski (57) ABSTRACT

A method and system of vehicle localization. Sensed data representing an environment of the vehicle is received from at least one sensor. A top view image of the environment is generated from the sensed data representing the environment of the vehicle. A vehicle localization is determined using a top view from a plurality of previously captured top view images that matches the generated top view and the sensed data. An output is generated including the vehicle localization.

21 Claims, 4 Drawing Sheets

(56) References Cited

U.S. PATENT DOCUMENTS

| | | | | |
|---|---|---|---|---|
| 2005/0190972 | A1* | 9/2005 | Thomas | G06K 9/209 382/218 |
| 2006/0111143 | A1* | 5/2006 | Pande | G01S 5/0018 455/556.1 |
| 2008/0043113 | A1* | 2/2008 | Ishii | G06T 3/4038 348/218.1 |
| 2009/0228204 | A1* | 9/2009 | Zavoli | G01C 21/30 701/532 |
| 2011/0063444 | A1* | 3/2011 | Okamoto | B60R 1/00 348/148 |
| 2011/0243455 | A1* | 10/2011 | Miyajima | G01C 21/3602 382/201 |
| 2012/0262580 | A1 | 10/2012 | Huebner et al. | |
| 2012/0269382 | A1* | 10/2012 | Kiyohara | G01C 21/26 382/103 |
| 2014/0293001 | A1 | 10/2014 | Yu et al. | |
| 2015/0070394 | A1* | 3/2015 | Yanagawa | G06T 3/0018 345/649 |
| 2015/0130942 | A1* | 5/2015 | Fujita | B60R 1/00 348/148 |
| 2015/0195496 | A1* | 7/2015 | Hayakawa | B60R 1/00 348/118 |
| 2015/0375680 | A1* | 12/2015 | Watanabe | B60R 1/00 701/36 |
| 2016/0001704 | A1* | 1/2016 | Nakasho | G07C 5/0891 701/36 |
| 2016/0187144 | A1 | 6/2016 | Modica et al. | |
| 2016/0209846 | A1* | 7/2016 | Eustice | G05D 1/0246 |
| 2016/0350927 | A1* | 12/2016 | Ma | G06T 5/002 |
| 2017/0015317 | A1* | 1/2017 | Fasola | B60W 30/12 |
| 2017/0054946 | A1* | 2/2017 | Lee | B60R 1/00 |
| 2017/0140229 | A1* | 5/2017 | Ogata | G06T 7/248 |
| 2017/0148136 | A1* | 5/2017 | Lee | B60R 1/00 |
| 2017/0287168 | A1* | 10/2017 | Jeong | G06T 3/4038 |
| 2017/0305462 | A1* | 10/2017 | Janardhana | B62D 13/06 |
| 2017/0366945 | A1* | 12/2017 | Uliyar | G01S 19/14 |
| 2018/0061055 | A1* | 3/2018 | Owechko | G06K 9/4604 |
| 2018/0093619 | A1* | 4/2018 | Han | G06K 9/00798 |
| 2018/0105173 | A1* | 4/2018 | Yamada | G02B 27/01 |
| 2018/0178780 | A1* | 6/2018 | Hwang | B60W 30/06 |
| 2018/0180422 | A1* | 6/2018 | Naito | G06T 7/74 |
| 2018/0208115 | A1* | 7/2018 | Katsumata | B60R 21/00 |
| 2018/0253823 | A1* | 9/2018 | Furuki | B60R 1/00 |
| 2018/0268566 | A1* | 9/2018 | Houts | G06T 7/74 |
| 2018/0376079 | A1* | 12/2018 | Shigemura | H04N 5/2625 |
| 2019/0001978 | A1* | 1/2019 | Takaki | B60W 30/18 |
| 2019/0084477 | A1* | 3/2019 | Gomez-Mendoza | B62D 13/06 |
| 2019/0111845 | A1* | 4/2019 | Karas | B60R 1/00 |
| 2019/0220039 | A1* | 7/2019 | Wu | B64C 39/024 |

OTHER PUBLICATIONS

M. Venkatesh and P. Vijayakumar, "Transformation Technique", International Journal of Scientific & Engineering Research, vol. 3, Issue 5, May 2012, 4 pages.

Byung-Hyun Lee, Jong-Hwa Song, Jun-Hyuck Im, Sung-Hyuck Im, Moon-Beom Heo and Gyu-In Jee, "GPS/DR Error Estimation for Autonomous Vehicle Localization", Sensors, 15, pp. 20779-20798, 2015, 20 pages.

* cited by examiner

METHOD AND SYSTEM FOR VEHICLE LOCALIZATION

TECHNICAL FIELD

The present disclosure relates to methods and systems for vehicle driver assistance and vehicle automation, and in particular, to a method, device and system for vehicle localization.

BACKGROUND

Vehicle driver assistance that enhance the awareness and safety of human drivers and autonomous vehicles increase driver safety and convenience. Vehicle localization is an important aspect of both of these applications. For example, an autonomous vehicle needs to know where a road is to be able to stay within the road, and needs to know where a specific lane is to be able to stay within the lane.

SUMMARY

In one aspect of the present disclosure, there is provided a method of vehicle localization. Sensed data representing an environment of the vehicle is received from at least one sensor. A top view image of the environment is generated from the sensed data representing the environment of the vehicle. A vehicle localization is determined using a top view from a plurality of previously captured top view images that matches the generated top view and the sensed data. An output is generated including the vehicle localization.

In another aspect of the present disclosure, there is provided a vehicle control system for a vehicle. The vehicle control system comprises a processor, at least one sensor coupled to the processor for sensing an environment of a vehicle, and a memory coupled to the processor. The memory stores executable instructions that, when executed by the processor, cause the vehicle control system to perform a method of vehicle localization. Sensed data representing the environment of the vehicle is received from the at least one sensor. A top view image of the environment is generated from the sensed data representing the environment of the vehicle. A vehicle localization is determined using a top view from a plurality of previously captured top view images that matches the generated top view and the sensed data. An output is generated including the vehicle localization.

In a further aspect of the present disclosure, there is provided a vehicle comprising a mechanical system for moving the vehicle, a drive control system coupled to the mechanical system for controlling the mechanical system and a vehicle control system coupled to the drive control system. The vehicle control system comprises a processor, at least one sensor coupled to the processor for sensing an environment of a vehicle, and a memory coupled to the processor. The memory stores executable instructions that, when executed by the processor, cause the vehicle control system to perform a method of vehicle localization. Sensed data representing the environment of the vehicle is received from the at least one sensor. A top view image of the environment is generated from the sensed data representing the environment of the vehicle. A vehicle localization is determined using a top view from a plurality of previously captured top view images that matches the generated top view and the sensed data. An output is generated including the vehicle localization.

In yet a further aspect of the present disclosure, there is provided a non-transitory machine readable medium having tangibly stored thereon executable instructions for execution by a processor of a vehicle control system for a vehicle. The executable instructions, when executed by the processor, cause the vehicle control system to perform a method of vehicle localization. Sensed data representing an environment of the vehicle is received from at least one sensor. A top view image of the environment is generated from the sensed data representing the environment of the vehicle. A vehicle localization is determined using a top view from a plurality of previously captured top view images that matches the generated top view and the sensed data. An output is generated including the vehicle localization.

DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium.

For convenience, the present disclosure describes example embodiments of methods and systems of localization with reference to a motor vehicle, such as a car, truck, bus, boat, aircraft, warehouse equipment, construction equipment, tractor or other farm equipment. The teachings of the present disclosure are not limited to any particular type of vehicle, and may be applied to vehicles that do not carry passengers as well as vehicles that do carry passengers. The teachings of the present disclosure may also be implemented in non-vehicular mobile robots including, but not limited to, autonomous vacuum cleaners, rovers and lawn mowers.

Figure 1:
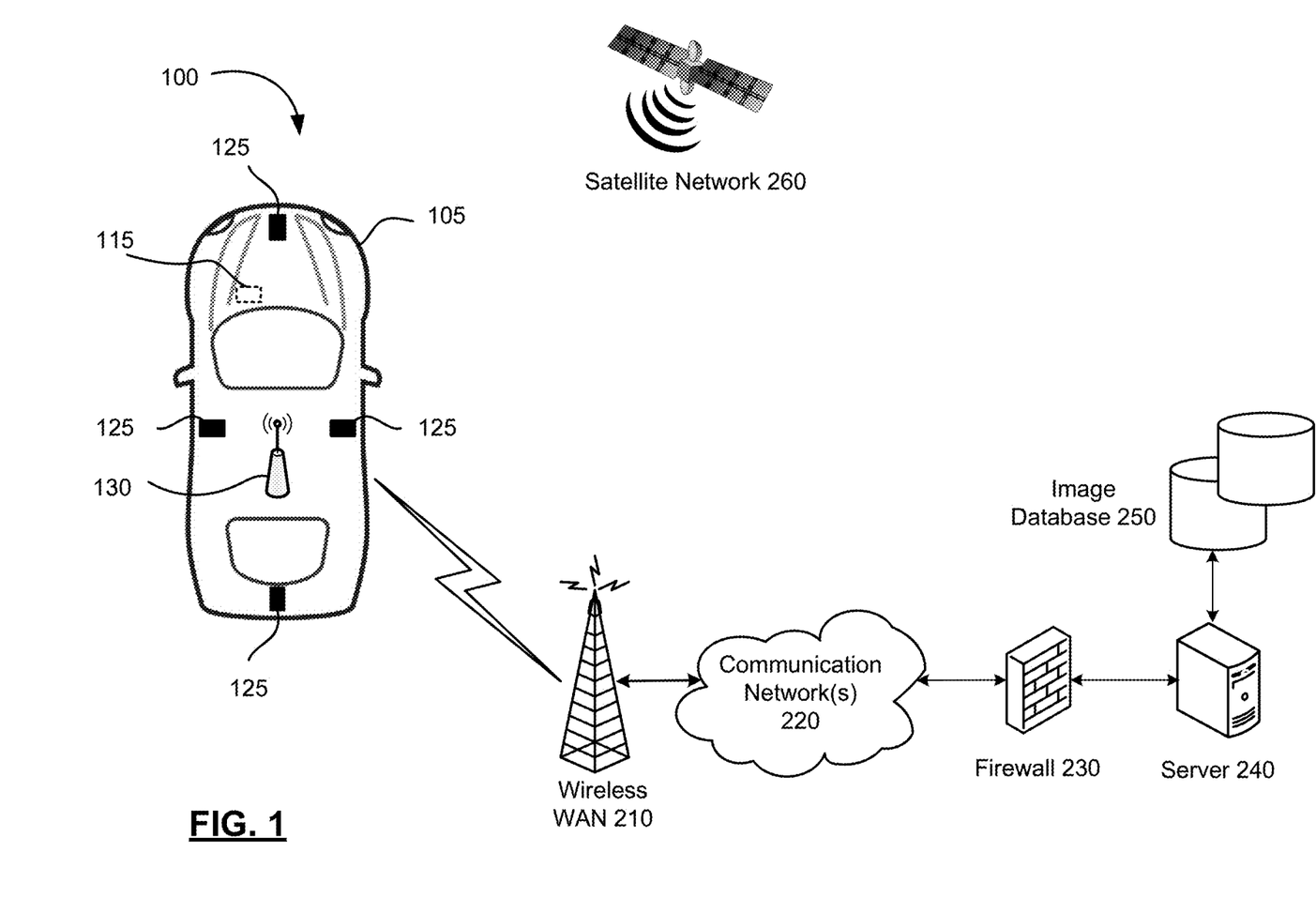
FIG. 1 is a schematic diagram of a vehicle localization system in accordance with one example embodiment of the present disclosure.

FIG. 1 is a schematic view showing selected components of a vehicle localization system 100 in accordance with one example embodiment of the present disclosure. The vehicle localization system 100 is part of a vehicle control system 115 embedded in a vehicle 105. The vehicle control system 115 is coupled to a drive control system 150 and a mechanical system 190 of the vehicle 105, as described below. In other embodiments, the vehicle localization system 100 may be a dedicated system. The vehicle control system 115 allows the vehicle 105 to be operable in a fully-autonomous, semi-autonomous or fully user-controlled mode.

The vehicle localization system 100 comprises a plurality of sensors 110 located about the vehicle 105 and one or more wireless transceivers 130 each coupled to a controller of the vehicle control system 115. The plurality of sensors 110 comprise digital cameras 112, LIDAR units 114, synthetic aperture radar (SAR) units 116, an inertial measurement unit (IMU) 118 and an electronic compass 119. The sensors 110, when active, repeatedly (e.g., in regular intervals) sense information and provide the sensed information to the vehicle control system 115, including the vehicle localization system 100, in real-time or near real-time.

The cameras 112 may capture static images or videos comprising a series of consecutive frames. The cameras 112 may be two-dimensional (2D) cameras or stereoscopic or three-dimensional (3D) cameras that may sense depth and the three-dimensional structure of the environment surrounding the vehicle 105. The cameras 112 may capture visible light, infrared or both. The IMU 118 senses the vehicle's specific force and angular rate using a combination of accelerometers and gyroscopes. Alternatively, one or more of the LIDAR units 114, SAR units 116 and IMU 118 may be used to sense the three-dimensional structure of the environment surrounding the vehicle 105.

Using the sensors 110, the vehicle localization system 100 may collect information about a local environment of the vehicle 105 (e.g., any immediately surrounding obstacles) as well as information from a wider vicinity (e.g., the LIDAR units 114 and SAR units 116 may collect information from an area of up to 100 m radius around the vehicle 105). The vehicle localization system 100 may also collect information about the position and orientation of the vehicle 105 using the IMU 118. Using the IMU 118 and other sensors the vehicle control system 115 to determine the linear speed (e.g. odometer), angular speed, acceleration and tire grip of the vehicle 105, among other factors.

In the shown embodiment, there are four sensors units 125 located at the front, rear, left side and right side of the vehicle 105, respectively. The number and location of the sensor units 125 may be different in other embodiments. For example, in another embodiment, the sensor units 125 may be located on the top of the vehicle 105 in a fixed or rotating carousel, or other housing. The sensor units 125 may comprise one or any combination of cameras 112, LIDAR units 114, and SAR units 116. The sensor units 125 are mounted or otherwise located to have different fields of view (FOVs) between adjacent sensor units 125 to capture the environment surrounding the vehicle 105. The different FOVs may be overlapping.

The wireless transceivers 130 enable the vehicle control system 115 to exchange data and optionally voice communications with a wireless wide area network (WAN). The vehicle localization system 100 may use the wireless WAN 210 to access a server 240, such as a driving assist server, via one or more communications networks 220, such as the Internet. The server 240 may be implemented as one or more server modules and is typically located behind a firewall 230. The server 240 is connected to image resources such as one or more image databases 250. The image databases 250 may be physically located either locally or remotely from the server 240. The image database 250 comprises a plurality of top view images (also known as bird's eye view images). In other embodiments, the image resources may be an image service that searches and fetches images from one or more third party image databases or services (such as Google Maps™ or Google Earth™).

The plurality of top view images stored in the image databases 250 are aerial images. The aerial images may be 2D images, 3D images or a combination thereof. The aerial images may be one or a combination of digital photographs captured with a digital camera, LIDAR images captured with a LIDAR unit, or SAR images captured with a SAR unit carried by the satellites, planes, aerial drones or other suitable means. The aerial images are images captured by satellites, planes, aerial drones or other suitable means, or a combination thereof. The image resources may be unconventional in that the images are captured inside parking garages, bridges, tunnels or other areas where planes and conventional equipment for acquiring aerial images cannot travel. Such images may be acquired by crowdsourcing to user's aerial drones or the like.

The servers 240 or image databases 250 may comprise an image registry describing and identifying the aerial images. The image registry may comprise a record for each image in the image databases 250. Each record may include an image identifier (ID) identifying the respective aerial image, optionally location information (e.g., latitude and longitude) identifying the location captured by the image or a range thereof, and optionally image features from image and/or object recognition analysis previously performed on the image.

The vehicle localization system 100 also includes a satellite receiver 132. The vehicle localization system 100 may use signals received by the satellite receiver 132 from the plurality of satellites in the satellite network 260 to determine its position. The satellite network 260 typically comprises a plurality of satellites which are part of at least one Global Navigation Satellite System (GNSS) that provides autonomous geo-spatial positioning with global coverage. For example, the satellite network 260 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

Figure 2:
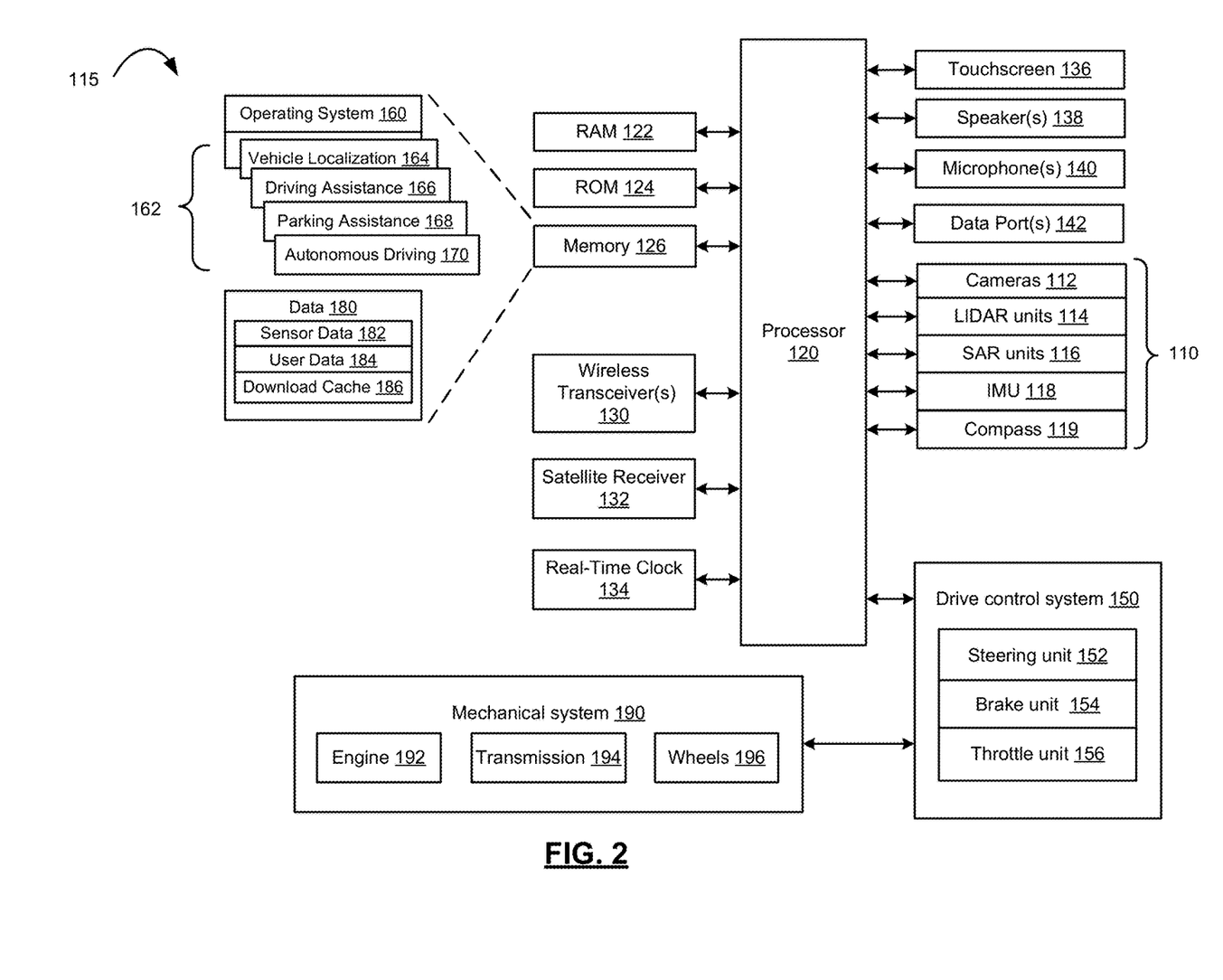
FIG. 2 is a block diagram of a vehicle control system embodying the vehicle localization system of FIG. 1.

Reference is next made to FIG. 2 which illustrates select components of the vehicle control system 115 in accordance with an example embodiment of the present disclosure. The processor 120 is coupled to a plurality of components via a communication bus (not shown) which provides a communication path between the components and the processor 120. The processor 120 is coupled to a drive control system 150, Random Access Memory (RAM) 122, Read Only Memory (ROM) 124, persistent (non-volatile) memory 126 such as flash erasable programmable read only memory (EPROM) (flash memory), one or more wireless transceivers 130 for exchanging radio frequency signals with a wireless network 210, a satellite receiver 132 for receiving satellite signals from a satellite network 260 that comprises a plurality of satellites which are part of a global or regional satellite navigation system, a real-time clock (RTC) 134, and a touchscreen 136.

The wireless transceivers 130 may comprise one or more cellular (RF) transceivers for communicating with a plurality of different radio access networks (e.g., cellular networks) using different wireless data communication protocols and standards. The vehicle localization system 100 may communicate with any one of a plurality of fixed transceiver base stations (one of which is shown in FIG. 1) of the wireless WAN 210 (e.g., cellular network) within its geographic coverage area. The mobile transceiver 102 may send and receive signals over the wireless WAN 210. The wireless transceivers 130 may comprise a multi-band cellular transceiver that supports multiple radio frequency bands.

The wireless transceivers 130 may also comprise a wireless local area network (WLAN) transceiver for communicating with a WLAN (now shown) via a WLAN access point (AP). The WLAN may comprise a Wi-Fi wireless network which conforms to IEEE 802.11x standards (sometimes referred to as Wi-Fi®) or other communication protocol.

The wireless transceivers 130 may also comprise a short-range wireless transceiver, such as a Bluetooth® transceiver, for communicating with a mobile computing device, such as a smartphone or tablet. The wireless transceivers 130 may also comprise other short-range wireless transceivers including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

The RTC 134 is a low power subsystem that runs even when the mobile transceiver 102 is in deep sleep mode. The RTC 134 typically comprises a crystal oscillator that provides accurate real-time information, such as those provided by Atmel Corporation.

The touchscreen 136 comprises a display such as a color liquid crystal display (LCD), light-emitting diode (ED) display or active-matrix organic light-emitting diode (AMO-LED) display, with a touch-sensitive input surface or overlay connected to an electronic controller. Additional input devices (not shown) coupled to the processor 120 may also be provided including buttons, switches and dials.

The vehicle control system 115 also includes one or more speakers 138, one or more microphones 140 and one or more data ports 142 such as serial data ports (e.g., Universal Serial Bus (USB) data ports). The system may also include other sensors such as tire pressure sensors (TPSs), door contact switches, light sensors, proximity sensors, etc.

The vehicle control system 115 also includes a drive control system 150 that serves to control movement of vehicle 105. The drive control system 150 comprises a steering unit 152, a brake unit 154 and a throttle unit 156, each of which may be implemented as software modules or control blocks within the drive control system 150. The steering unit 152, brake unit 154 and throttle unit 156 process, when in fully or semi-autonomous driving mode, received path information received from a path planning system (not shown) and generate control signals to control the steering, braking and throttle of the vehicle 105, respectively to drive a planned path. The drive control system 150 may include additional components to control other aspects of the vehicle 105 including, for example, control of turn signals and brake lights.

The mechanical system 190 receives control signals from the drive control system 115 to operate the mechanical components of the vehicle 105. The mechanical system 180 effects physical operation of the vehicle 105. The mechanical system 190 comprises an engine 192, a transmission 194 and wheels 196. The engine 192 may be a gasoline-powered engine, a battery-powered engine, or a hybrid engine, for example. Other components may be included in the mechanical system 190, including, for example, turn signals, brake lights, fans and windows.

A graphical user interface (GUI) of the vehicle control system 115 is rendered and displayed on the touchscreen 136 by the processor 120. A user may interact with the GUI using the touchscreen and optionally other input devices (e.g., buttons, dials) to display relevant information, such as navigation information, driving information, parking information, media player information, climate control information, etc. The GUI may comprise a series of traversable content-specific menus.

The memory 126 has stored thereon operating system software 160 that is executed by the processor 120 as well as a number of applications 162 in addition to the GUI. The applications 160 include vehicle localization 164, driving assistance 166, parking assistance 168 and autonomous driving 170 for fully or semi-autonomous driving. Other applications such as mapping, navigation, climate control, media player, telephone and messaging applications, etc. are also stored in the memory. The vehicle localization 164, when executed by the processor 120, causes the operations of method 500 to be performed.

The memory 126 also stores a variety of data 180. The data 180 may comprise sensor data 182 sensed by the sensors 110, user data 184 comprising user preferences, settings and optionally personal media files (e.g., music, videos, directions, etc.), and a download cache 186 comprising data downloaded via the wireless transceivers 130 such as top view images downloaded from the image database 250. The download cache 186 may be deleted periodically, for example, after a predetermined amount of time. System software, software modules, specific device applications, or parts thereof, may be temporarily loaded into a volatile store, such as RAM 122, which is used for storing runtime data variables and other types of data or information. Data received by the vehicle control system 115 may also be stored in the RAM 122. Although specific functions are described for various types of memory, this is merely one example, and a different assignment of functions to types of memory may also be used.

Figure 5:
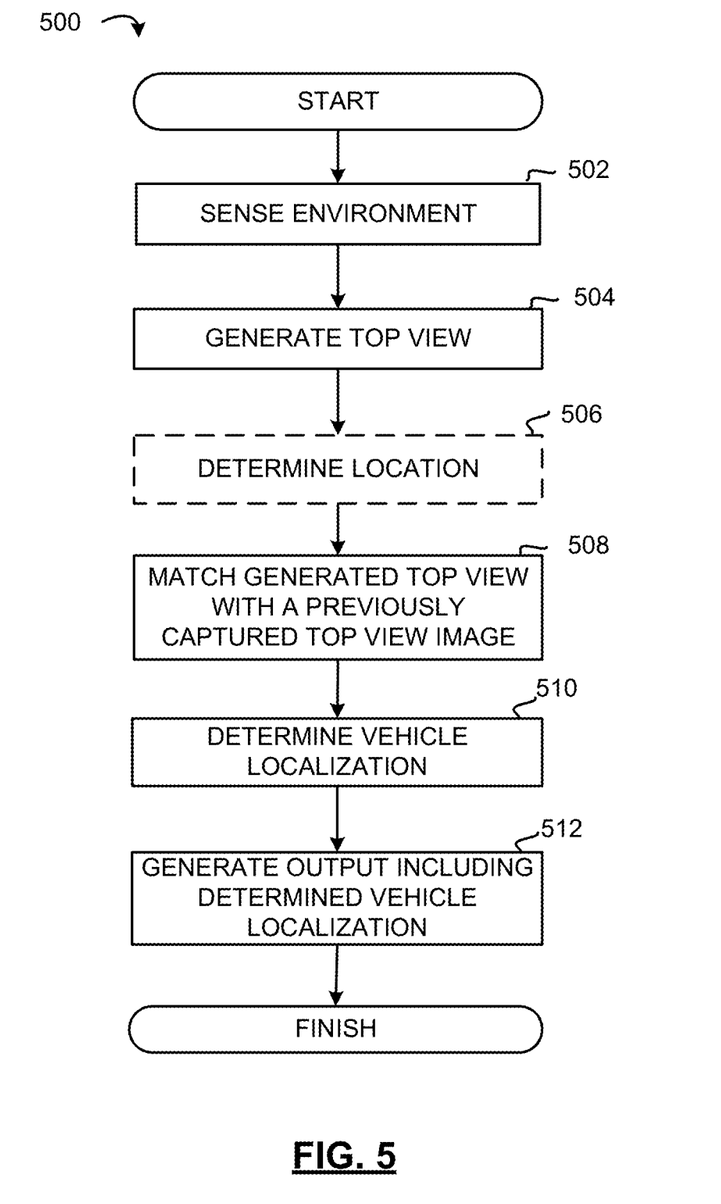
FIG. 5 is a flowchart illustrating an example method of vehicle localization in accordance with one example embodiment of the present disclosure.

Reference is now made to FIG. 5 which illustrates a flowchart of a method 500 of vehicle localization in accordance with one embodiment of the present disclosure. The method 500 may be carried out by software executed, for example, by the processor 120 of the vehicle control system 115. Coding of software for carrying out such a method 500 is within the scope of a person of ordinary skill in the art provided the present disclosure. The method 500 may contain additional or fewer processes than shown and/or described, and may be performed in a different order. Machine readable code executable by the processor 120 to perform the method 500 may be stored in a non-transitory machine readable medium such as the memory 126 of the vehicle control system 115.

At 502, data representing an environment of the vehicle 105 is acquired by a plurality of sensor units 125 mounted or otherwise located to have different FOVs between adjacent sensor units 125 to capture the environment surrounding the vehicle 105. The different FOVs may be overlapping. In some examples, four sensors units 125 located at the front, rear, left side and right side of the vehicle 105, respectively, sense data about the environment in front, rear, left side and right side of the vehicle 105, respectively. Alternatively, a single sensor unit 125 mounted to rotate 360 degrees (e.g., in a rotating carousel) to capture the environment surrounding the vehicle 105 may be used instead of a plurality of sensor units 125.

The plurality of sensor units 125 comprise each camera 112 which capture four images of the view of from the front, rear, left side and right side of the vehicle 105, respectively. The sensor units 125 may also comprise a LIDAR unit 114 and/or SAR unit 116 in addition to, or instead of, the cameras 112. The cameras 112 may be stereoscopic or 3D cameras that sense depth and a three-dimensional structure of the environment surrounding the vehicle 105. The cameras 112 may capture visible light, infrared or both.

At 504, a top view image (also known as a bird's eye view) of the vehicle 105 in the environment is generated by the processor 120 using at least the four images captured by the cameras 112. Top view image generation techniques are known in the art and will not be described in detailed herein. Generally, top view image generation comprises transforming (e.g., rotating and scaling) the images using the angle of the image plane of the cameras 112 relative to a horizontal plane of the vehicle 105 (e.g., vehicle frame), projecting the transformed image onto a 2D plane, analysing the images to identify common features using image and/or object recognition techniques, and stitching (e.g., combining) the images to form a composite image. Overlapping FOVs captured by different cameras 112 may assist in the stitching operation by looking for common features in different images with overlapping FOVs for aligning images when stitching.

When consecutive frames (e.g., video) is captured when the vehicle 105 is in motion, the motion of the vehicle 105 may be used to detect the depth of the image and 3D structure of the environment to generate a more realistic top view. Alternatively, 3D images from stereoscopic or 3D cameras, or other sensors data 182 such as IMU data, LIDAR data and SAR data or any combination thereof may be used to detect the 3D structure of the environment to generate a more realistic top view. When the sensor units 125 comprise stereoscopic or 3D cameras, LIDAR units 114 and/or SAR units 116, the generated top view image may be a 3D image. When the cameras 112 capture infrared, the generated top view image may be an infrared image.

Figure 3:
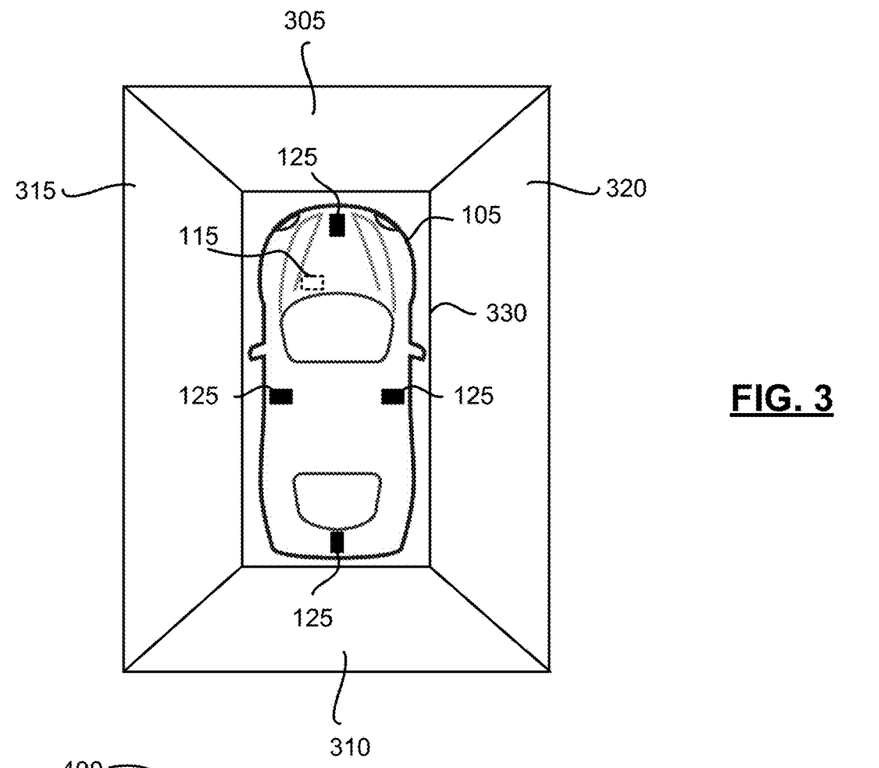
FIG. 3 is a schematic diagram showing a top view generated by the vehicle localization system of FIG. 1.

FIG. 3 illustrates an example top view image 300. Image segments 305, 310, 315 and 320 represent views of the front, rear, left side and right side of the vehicle 105, respectively, transformed during the top view image generation process. The centre 330 of the image represents a dead zone not captured by any of the cameras 112.

At 506, a geolocation of the vehicle 105 is determined. The operation 506 is optional. In other embodiments, the operation 506 may be omitted. In some examples, the geolocation is determined using the satellite receiver 132. In other examples, the geolocation is determined by triangulation using one or more of the wireless transceivers 130 and information received from nodes in the wireless WAN 210 (e.g., cellular towers). In yet other examples, the geolocation may be determined from or in combination with data from a calendar application, messaging application or other means. In yet other examples, the geolocation may be determined from a last known geolocation which, for example, may be stored in the user data 184 stored in the memory 126. The last known geolocation may be a geolocation previously determined using the satellite receiver 132, triangulation or other means. The geolocation may define a latitude and longitude, for example, in decimal degrees (DD), degrees minutes seconds (DMS) or degrees decimal minutes (DDM).

At 508, the generated top view image is compared to a pre-existing top view reference, for example, previously captured top view images (also known as aerial images, as described above) to match the generated top view image with a previously captured top view image. The previously captured top view images may be stored in one or more top view image resources, such as image database 250 accessible over a communications network 220 (e.g., Internet) via the wireless transceivers 130. Alternatively, the image resources may be image databases stored locally in the memory 126.

The image resources may include different types of images, such as visible light images, infrared images, 2D images and 3D images. When the image resources include different types of images, top view images of the same type as the generated top view images are compared. For example, when the generated top view image is 3D image, the plurality of previously captured top view images with which it is compared are also 3D images. For another example, when the generated top view image is an infrared image, the plurality of previously captured top view images with which it is compared are also infrared images.

The top view images in the plurality of top view images may be associated with location information identifying a location captured by the respective top view image. The location information may be stored in metadata within the respective image files. The location information may be GNSS data (e.g., GPS data) determined and encoded in the image files when the images were captured. The location information may specify a specific location in terms of latitude and longitude identifying the location captured by the respective top view image, or range of latitudes and longitudes identifying the location captured by the respective top view image. The latitude and longitude may be defined, for example, in DD, DMS or DDM.

When a geolocation of the vehicle 105 is determined in operation 506, the plurality of top view images with which the generated top view is compared is a subset of images of the same type as the generated top view images i.e. a geographic portion of pre-existing top view reference may be used. The plurality of top view images in the image resources are filtered (or selected) by comparing and matching the determined geolocation of the vehicle 105 with the location information associated with the plurality of top view images. Filtering the top view images to be analysed based on a quick geolocation determination reduces the number of images to be analysed significantly, thereby reducing the processing time and increasing the efficiency of the image analysis to be performed.

The geolocation may be determined to match the location information associated with the plurality of top view images in the one or more top view image resources when the location information is within a threshold distance of the determined geolocation. In some examples, the threshold distance is less than 20 meters. In some examples, the threshold distance is less than 10 meters. In some examples, the threshold distance is less than 5 meters. In some examples, the threshold distance is less than 2 meters. In some examples, the threshold distance is less than 1 meter.

Image and/or object recognition techniques are used in operation 508 to identify image features in the sensed data (e.g., camera, LIDAR and/or SAR images). For example, LIDAR and SAR data may be used in combination with images captured by the cameras 112 to identify features in the camera images, and consequently, identify features in the environment surrounding the vehicle 105. The image and/or object recognition techniques may be performed partially or entirely by the vehicle control system 115 (e.g., by the processor 120) by an image/object recognition application or system (not shown) or one or more remote devices, such as one or more server(s) 240 accessible over a communications network (e.g., Internet) via the one or more wireless transceivers 130. The operation 508 may be more efficiently performed via the one or more servers 240. When performed by the one or more servers 240, the vehicle control system 115 may send the generated top view image and optionally the determined geolocation information from the operation 506 to one or more image analysis servers and receives a matching top view image in response. Alternatively, the vehicle control system 115 may send the images captured from the sensor units 125 (e.g., camera, LIDAR and/or SAR images) to the image analysis servers to generate the top view image as well as the determining the matching top view image.

In the image and/or object recognition, the generated top view image may be analyzed using a variety of algorithms to identify image features, the dimensions of the image features, and the location and/or position (orientation) of the image features. Image features in the generated top view image may be identified as one of a number of identifiable objects (e.g., trees, buildings, bridges, roads, vehicles, pillar/posts, curbs, street signs, lanes, stop lights, etc.), shapes, lines, textures, patterns or other distinct features, or a combination thereof. The result of the analysis of the generated top view image may then be compared to the plurality of top view images to identify a top view image most similar to the generated top view.

The plurality of top view images in the one or more top view image resources may be previously analysed in a manner similar to how the generated top view is analysed for efficiency. The resultant information may be encoded in metadata in the respective image files or in a corresponding record in an image registry describing and identifying the plurality of top view images in the one or more top view image resources. Alternatively, the plurality of top view images may be analysed in real-time based on the identified image features, the dimensions of the image features, and the feature location and/or position within the generated top view image.

The top view image that is the most similar to the generated top view may be determined to be the matching top view image after all images to be compared have been compared. Alternatively, a top view image which exceeds a confidence threshold may be determined to be the matching top view image, for example, a first identified top view image identified which exceeds the confidence threshold. The confidence threshold may be based on a measure of similarity between the images, expressed as a percentage for example, which may be based on a pixel-to-pixel comparison or other basis. The confidence threshold may be configurable to provide a user configurable balance between accuracy and speed of the image/object recognition analysis. An example confidence threshold is 80%.

At 510, a vehicle localization is determined in accordance with the matching top view image and sensor data 182 from, for example, one or more of the satellite receiver 132, LIDAR units 114, SAR units 116, IMU 118 and/or electronic compass 119. Vehicle localization may comprise using the sensed data to determine the location and orientation (position) of the vehicle 105 relative to objects (e.g., identifiable objects such as trees, buildings, bridges, roads, vehicles, pillar/posts, curbs, street signs, lanes, stop lights, etc. identified in the image/object recognition analysis) within the top view image.

The vehicle localization comprises localization information that may comprise a location and a heading (direction or bearing) of the vehicle 105. The location may be specified by latitude and longitude coordinates that may be defined in DD, DMS, or DDM, for example, using GNSS data from the satellite receiver 132. The localization information may also comprise location information concerning objects in the top view image, which may be specified in absolute terms by latitude and longitude coordinates or relative terms such as a distance from the vehicle 105 (or distances from a number of different reference points on the vehicle 105, such as the location of the sensor units 125).

At 512, an output including the vehicle localization is generated. The vehicle localization output may be sent to other subsystems or applications, or transmitted to a remote device or service, such as a vehicle monitoring or vehicle tracking service, via one or more of the wireless transceivers 130. For example, the determined vehicle localization may be processed by one or more of the driving assistance application 166, parking assistance application 168, autonomous driving application 170, mapping application, or navigation application to generate derived data based on the determined vehicle localization, which may then be displayed on the touchscreen 136. The derived data may be driving instructions (e.g., backup instructions) generated by the driving assistance application 166, parking instructions generated by the parking assistance application 168, a path plan or drive signals generated by the fully or semi-autonomous driving application 170, an enhanced map with vehicle localization generated by the mapping application, or directions generated by the navigation application, for example.

Figure 4:
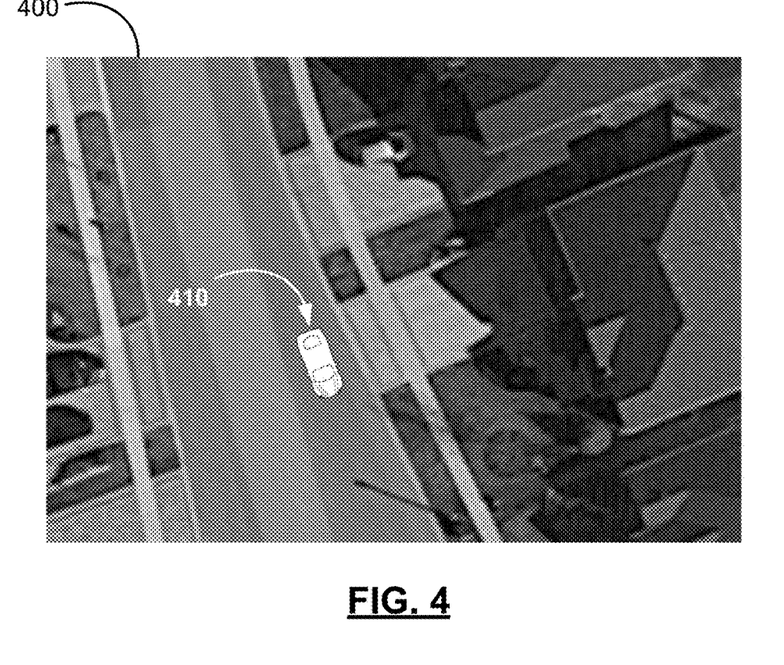
FIG. 4 is an example top view vehicle localization image generated by the vehicle localization system of FIG. 1 in accordance with one example embodiment of the present disclosure.

The vehicle localization may be displayed on the touchscreen 136. For example, the vehicle localization may be displayed on the touchscreen 136 along with the matching top view image by a mapping application or navigation application. A graphical representation of the vehicle 105 may be overlaid over the matching top view image as a representation of the vehicle localization. FIG. 4 is an example top view vehicle localization image 400 generated by the vehicle localization system of 100 in which a graphical representation of a car 410 overlays the matching top view image at a location and in a position (orientation) corresponding to the determined vehicle localization.

The present disclosure provides a method for vehicle localization. The present disclosure teaches methods and systems for using computer vision based on sensed data to generate a top view image, and using the generated top view to perform vehicle localization using previously captured aerial images. GPS alone is insufficient for localization applications which require high precision and reliability, such as autonomous parking and autonomous driving, which may be require precision in the order of decimeters, for example. One potential advantage of the method disclosed herein is that vehicle localization may be performed faster and with more precision.

Other potential advantages of the method disclosed is that, compared to alternative approaches, aerial maps are readily available from numerous sources, are relatively fast and relatively easily to capture and update using satellites, planes or drones, among other possibilities, may be of improved quality and accuracy (e.g., using different technologies of aerial imaging), may be produced more safely and at lower cost. For example, alternative approaches include generating maps using ground surveying vehicles.

Making such maps and keeping such maps up-to-date is a difficult and time consuming task, and requires the ground surveying vehicle drive each street frequently. The method described herein obviates the need for ground surveying vehicles and provides other potential benefits outlined above.

Although the foregoing example describes image recognition primarily based on identifying image features in the generated top view and previously captured top view (aerial) images, in other examples the image recognition analysis may be based on a pixel-by-pixel comparison.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

All values and sub-ranges within disclosed ranges are also disclosed. Also, although the systems, devices and processes disclosed and shown herein may comprise a specific number of elements/components, the systems, devices and assemblies may be modified to include additional or fewer of such elements/components. For example, although any of the elements/components disclosed may be referenced as being singular, the embodiments disclosed herein may be modified to include a plurality of such elements/components. The subject matter described herein intends to cover and embrace all suitable changes in technology.

Although the present disclosure is described, at least in part, in terms of methods, a person of ordinary skill in the art will understand that the present disclosure is also directed to the various components for performing at least some of the aspects and features of the described methods, be it by way of hardware (DSPs, ASIC, or FPGAs), software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device (e.g., a vehicle control system) to execute examples of the methods disclosed herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of vehicle localization, comprising:
receiving images and sensor data representing an environment surrounding a vehicle from at least one sensor unit, the at least one sensor unit comprising a camera and one or more of a LiDAR unit and synthetic aperture radar (SAR) unit, the sensor data comprises one or more of LiDAR data and SAR data;
generating a top view image of the environment using the images of the environment;
determining a geolocation of the vehicle;
filtering a plurality of top view reference images based on the determined geolocation to obtain a set of top view reference images, wherein each image in the set of top view reference images is associated with a location within a threshold distance of the determined geolocation;
comparing the generated top view image to the set of top view reference images to identify a matching top view reference image; and
performing vehicle localization using the matching top view reference image and the sensor data to determine a location and an orientation of the vehicle within the matching top view image.

2. The method of claim 1, further comprising:
identifying objects in the generated top view image and the images in the set of top view reference images;
wherein comparing comprises matching identified image objects in the generated top view image with identified image objects in each top view reference image in the set of top view reference images.

3. The method of claim 2, wherein performing vehicle localization further comprises performing vehicle localization using the matching top view reference image and sensor data to determine the location and orientation of the vehicle relative to identified objects in the matching top view image using the sensor data.

4. The method of claim 1, wherein the top view image of the environment is generated using the images and the sensor data.

5. The method of claim 1, wherein the geolocation of the vehicle includes by latitude and longitude coordinates in decimal degrees (DD), degrees minutes seconds (DMS) or degrees decimal minutes (DDM).

6. The method of claim 1, wherein the images and the sensor data is received from a plurality of sensor units located around the vehicle, each of the plurality of sensor units having a different field of view the environment surrounding the vehicle.

7. The method of claim 6, wherein the plurality of sensor units are located at the front, rear, left side and right side of the vehicle.

8. The method of claim 1, further comprising:
sending the determined location and position of the vehicle to one or more of a driving assistance application, parking assistance application, fully or semi-autonomous driving application, mapping application, or navigation application to generate derived data based on the determined location and position of the vehicle.

9. The method of claim 1, wherein the camera is a stereoscopic camera or a three-dimensional (3D) camera that senses depth and a three-dimensional structure of the environment surrounding the vehicle, wherein the generated top view image and the set of top view references images are 3D images.

10. The method of claim 1, wherein the set of top view reference images are aerial images.

11. The method of claim 1, wherein the generated top view image and the set of top view reference images are 3D images.

12. The method of claim 1, further comprising:
identifying features in the generated top view image and the top view reference images in the set of top view reference images using an object recognition algorithm;
wherein comparing comprises matching identified features in the generated top view image with identified features in each top view reference image in the set of top view reference images.

13. The method of claim 12, wherein performing vehicle localization further comprises performing vehicle localization using the matching top view reference image and sensor data to determine the location and orientation of the vehicle relative to identified features in the matching top view image using the sensor data.

14. The method of claim 13, wherein the identified objects the matching top view image are displayed via a graphical representation overlaying the matching top view image.

15. The method of claim 14, wherein the identified features comprise any one or more of identifiable objects, identifiable shapes, identifiable lines, identifiable textures, identifiable patterns or other distinct features.

16. The method of claim 14, wherein the identified features comprise identified objects, wherein the identified objects comprise any one or more of trees, buildings, bridges, roads, vehicles, pillar/posts, curbs, street signs, lanes, or stop lights.

17. A vehicle control system for a vehicle, comprising:
a processor;
at least one sensor unit coupled to the processor for sensing an environment surrounding a vehicle, the sensor unit comprising a camera and one or more of a LIDAR unit and synthetic aperture radar (SAR) unit;
a memory coupled to the processor, the memory storing executable instructions that, when executed by the processor, cause the vehicle to:
receive images and sensor data representing the environment from the at least one sensor unit, the sensor data comprising one or more of LIDAR data and SAR data;
generate a top view image of the environment using the images of the environment;
determine a geolocation of the vehicle;
filter a plurality of too view reference images based on the determined geolocation to obtain a set of top view reference images, wherein each image in the set of top view reference images is associated with a location within a threshold distance of the determined geolocation;
compare the generated top view image to the set of top view reference images to identify a matching top view reference image; and
perform vehicle localization using the matching top view reference image and sensor data to determine a location and an orientation of the vehicle within the matching too view image.

18. The vehicle control system of claim 17, comprising a plurality of sensor units located around the vehicle such that the sensor units have different fields of view.

19. A non-transitory machine readable medium having tangibly stored thereon executable instructions for execution by a processor of a vehicle control system for a vehicle, wherein the executable instructions, when executed by the processor, cause the vehicle control system to:
receive images and sensor sensed data representing an environment surrounding a vehicle from at least one sensor unit, the sensor unit comprising a camera and one or more of a LIDAR unit and synthetic aperture radar (SAR) unit, each image representing a different field of view of the environment, the sensor data comprising one pr more of LiDAR data and SAR data;
generate a top view image of the environment using the images of the environment;
determine a geolocatlon of the vehicle;
filter a plurality of top view reference images based on the determined geolocation to obtain a set of top view reference images, wherein each image in the set of top view reference images is associated with a location within a threshold distance of the determined geolocation;
compare the generated top view image to the set of top view reference images to identify a matching top view reference image;
perform vehicle localization using the matching top view reference image and sensor data to determine a location and an orientation of the vehicle within the matching too view image.

20. The method of claim 1, further comprising:
outputting the result of the vehicle localization.

21. The method of claim 20, wherein the outputting comprises:
displaying the matching top view image on a display with a graphical representation of the vehicle overlaying the matching top view image in accordance with the determined location and orientation, the graphical representation of the vehicle being positioned with respect to the matching top view image at a location and in an orientation corresponding to the determined location and orientation.

* * * * *